(12) United States Patent
Shiina et al.

(10) Patent No.: US 8,868,306 B1
(45) Date of Patent: Oct. 21, 2014

(54) WHEEL LOADER

(71) Applicant: Komatsu Ltd., Tokyo (JP)

(72) Inventors: Toru Shiina, Komatsu (JP); Hirotaka Takahashi, Komatsu (JP); Yukio Takami, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/131,480

(22) PCT Filed: Aug. 8, 2013

(86) PCT No.: PCT/JP2013/071519
§ 371 (c)(1),
(2), (4) Date: Jan. 8, 2014

(51) Int. Cl.
*G06F 7/00* (2006.01)
*E02F 9/20* (2006.01)

(52) U.S. Cl.
CPC .................................. *E02F 9/2058* (2013.01)
USPC ............................................ 701/54; 701/50

(58) Field of Classification Search
USPC ....................................................... 701/50, 54
See application file for complete search history.

(56) References Cited

U.S. PATENT DOCUMENTS

| | | | | |
|---|---|---|---|---|
| 5,113,721 | A * | 5/1992 | Polly | 477/80 |
| 8,755,979 | B2 * | 6/2014 | Ishikawa et al. | 701/51 |
| 2002/0173404 | A1 * | 11/2002 | Takatori et al. | 477/53 |
| 2002/0173894 | A1 * | 11/2002 | Gorys et al. | 701/51 |
| 2003/0109977 | A1 * | 6/2003 | Landes et al. | 701/54 |
| 2008/0264045 | A1 * | 10/2008 | Hara et al. | 60/295 |
| 2009/0270225 | A1 * | 10/2009 | Whitney et al. | 477/115 |
| 2012/0152642 | A1 | 6/2012 | Takahashi et al. | |
| 2013/0049364 | A1 * | 2/2013 | Teets et al. | 290/45 |
| 2013/0092366 | A1 * | 4/2013 | Hyodo et al. | 165/287 |
| 2013/0133315 | A1 * | 5/2013 | Shibutani et al. | 60/311 |
| 2013/0261913 | A1 * | 10/2013 | Ishikawa et al. | 701/62 |

FOREIGN PATENT DOCUMENTS

| | | |
|---|---|---|
| JP | 6-183282 A | 7/1994 |
| JP | 2004-144254 A | 5/2004 |
| JP | 2008-39167 A | 2/2008 |
| JP | 2011-52793 A | 3/2011 |

OTHER PUBLICATIONS

International Search Report for the corresponding international application No. PCT/JP2013/071519, issued on Sep. 10, 2013.

* cited by examiner

*Primary Examiner* — Hussein A. Elchanti
(74) *Attorney, Agent, or Firm* — Global IP Counselors, LLP

(57) ABSTRACT

A control section selectively executes one of a first control and a second control when the accelerator opening degree is less than a first opening degree and a switching operation is performed by a forward and reverse switching operation lever. The control section controls a motor capacity control section so as to maintain the capacity of a hydraulic motor before and after the switching operation in the first control. The control section controls the motor capacity control section such that the capacity of the hydraulic motor is a minimum value which is set in advance at each speed level in the second control. The control section executes the first control when the temperature of the hydraulic oil is equal to or less than a first temperature and executes the second control when the temperature of the hydraulic oil is higher than the first temperature.

9 Claims, 11 Drawing Sheets

| TEMPERATURE [°C] | T0 | T1 | T2 | T3 | T4 |
|---|---|---|---|---|---|
| P_gain CORRECTION AMOUNT | a1 | a1 | a2 | 0 | 0 |
| I_gain CORRECTION AMOUNT | b1 | b1 | b2 | 0 | 0 |
| D_gain CORRECTION AMOUNT | 0 | 0 | 0 | 0 | 0 |

FIG. 9

WHEEL LOADER

CROSS-REFERENCE TO RELATED APPLICATIONS

This application is a U.S. National stage application of International Application No. PCT/JP2013/071519, filed on Aug. 8, 2013.

BACKGROUND

1. Field of the Invention

The present invention relates to a wheel loader.

2. Related Art

In a wheel loader which is provided with a so-called HST (hydro-static transmission) circuit, a hydraulic pump is driven by an engine, and hydraulic oil which is discharged from the hydraulic pump is supplied to a hydraulic motor. Then, a vehicle moves due to moving wheels being driven by the hydraulic motor.

In the past, as a wheel loader as described above, a wheel loader is known which electronically controls a capacity of the hydraulic motor as shown in Japanese Unexamined Patent Application Publication No. 2004-144254. The wheel loader is provided with a hydraulic motor, a cylinder, and a control valve. The cylinder has a cylinder body and a piston rod which extends and retreats with regard to the cylinder body, and an angle of an inclined shaft, that is, an inclining angle of the hydraulic motor is changed by movement of the piston rod. In addition, the piston rod is connected with the control valve. The control valve is an electromagnetic control valve which is electrically controlled by a control section. Accordingly, in the wheel loader, it is possible to arbitrarily change the capacity of the hydraulic motor by controlling the cylinder by electrically controlling the control valve.

As described above, the control section outputs a predetermined command signal to the control valve in a case where the capacity of the hydraulic motor is electronically controlled. The command signal is set using feedback control. In detail, actual hydraulic drive pressure which drives the hydraulic motor is detected and the command signal is set such that the actual hydraulic drive pressure is closer to a predetermined target hydraulic drive. Here, resistance of the hydraulic oil in a hydraulic circuit is large since viscosity of the hydraulic oil is large in a case where a temperature of the hydraulic oil is reduced. As a result, a response delay occurs in the hydraulic motor with regard to changes in the command signal to the control valve. As a result, there is a concern in that a phenomenon is repeated such that the actual hydraulic drive pressure is larger than or smaller than the target hydraulic drive pressure and hunting oscillation occurs along with this due to repetition of unstable increasing and decreasing of the rotations of the engine.

An object of the present invention is to suppress occurrence of hunting oscillation.

(1) A wheel loader according to an aspect of the present invention is provided with an engine, a hydraulic pump, a hydraulic motor, a motor capacity control section, moving wheels, an oil temperature detecting section, an accelerator opening detecting section, a forward and reverse switching operation member, an operation detecting section, and a control section. The hydraulic pump is driven by the engine. The hydraulic motor is a variable capacity hydraulic motor which is driven by hydraulic oil which is discharged from the hydraulic pump. The motor capacity control section controls the capacity of the hydraulic motor. The moving wheels are driven by the hydraulic motor. The oil temperature detecting section detects the temperature of the hydraulic oil. The accelerator opening detecting section detects an accelerator opening degree. The forward and reverse switching operation member performs a switching operation in order to output an instruction for switching a moving state of the vehicle to any one of a forward state, a reverse state or a neutral state. The operation detecting section detects a switching instruction from the forward and reverse switching operation member. The control section selectively executes a first control and a second control in a case where the accelerator opening degree is less than a first opening which is set in advance and a switching operation is performed by the forward and reverse switching operation member. The control section controls the motor capacity control section so as to maintain the capacity of the hydraulic motor before and after the switching operation when the first control is executed. The control section controls the motor capacity control section such that the capacity of the hydraulic motor is a minimum value which is set in advance at each speed level when the second control is executed. In addition, the control section executes the first control in a case where the temperature of the hydraulic oil is equal to or less than a first temperature which is set in advance. The control section executes the second control in a case where the temperature of the hydraulic oil is higher than the first temperature.

According to such a configuration, first, it is possible to prevent rapid deceleration of the wheel loader since the control section executes the first control or the second control when the switching operation is performed and the accelerator opening degree is less than the first opening. In detail, it is possible to prevent rapid deceleration of the wheel loader using the switching operation since the capacity of the hydraulic motor is maintained before and after the switching operation when the control section executes the first control. In addition, it is possible to prevent rapid deceleration of the wheel loader using the switching operation since the capacity of the hydraulic motor is the minimum value when the control section executes the second control.

Here, the control section executes the first control in a case where the temperature of the hydraulic oil is equal to or less than the first temperature which is set in advance, that is, a case such that the temperature of the hydraulic oil is a low temperature and it is easy for a response delay to occur in the hydraulic motor. The capacity of the hydraulic motor is maintained before and after the switching operation using the forward and reverse switching operation member when the control section executes the first control. As a result, it is possible for the capacity of the hydraulic motor after the first control is released to not rapidly become large compared to the capacity of the hydraulic motor when the first control is executed. Therefore it is possible to suppress the occurrence of hunting oscillation. In addition, it is difficult for hunting oscillation to occur even when the control section executes the second control since it is difficult for a response delay to occur in the hydraulic motor in a case where the temperature of the hydraulic oil is higher than the first temperature which is set in advance.

(2) Preferably, it is possible for the control section to execute maximum speed variable control where a maximum speed of a vehicle is changed on a plurality of levels due to a change in a minimum value of the capacity of the hydraulic motor. According to this configuration, it is possible for the operator to easily move at a desired speed.

(3) Preferably, the control section performs the first control in a case of selecting the maximum speed level where the maximum speed is the highest in maximum speed variable control. When the maximum speed level is selected, it is easy for hunting oscillation to occur since the minimum value of the capacity of the hydraulic motor is minimized. It is possible to efficiently suppress hunting oscillation by the control section executing the first control in the case where it is easy for hunting oscillation to occur. Here, it is preferable that the control section executes the second control since it is difficult for hunting oscillation to occur in a case where the temperature of the hydraulic oil is higher than the first temperature even in a case where the maximum speed level is selected.

(4) Preferably, the wheel loader is further provided with a vehicle speed detecting section which detects vehicle speed. According to this configuration, it is possible for the control section to execute various controls according to vehicle speed.

(5) Preferably, the control section releases execution of the first control or the second control when the vehicle speed reaches 0 km/h. According to this configuration, it is possible for the control section to release execution of the first control or the second control at a more appropriate timing.

(6) Preferably, the wheel loader is further provided with a pressure detecting section which detects hydraulic drive pressure which is pressure of the hydraulic oil which drives the hydraulic motor. Then, the control section executes a third control for controlling the motor capacity control section such that the hydraulic drive pressure is closer to a predetermined target hydraulic drive pressure in a case where the switching operation is not performed by the forward and reverse switching operation member. According to this configuration, the control section executes the third control since the wheel loader does not rapidly decelerate in a case where the switching operation is performed.

(7) Preferably, the control section controls the motor capacity control section in the third control such that the capacity of the hydraulic motor is equal to or more than a lower limit value which is set in advance based on the vehicle speed. It is easy for hunting oscillation to occur when the capacity of the hydraulic motor is small when the vehicle speed is low. In contrast to this, it is possible to suppress the occurrence of hunting oscillation by the control section controlling the motor capacity control section such that the capacity of the hydraulic motor is equal to or more than a lower limit value which is set in advance based on the vehicle speed.

(8) Preferably, the first temperature is 10 degrees. It is possible to more appropriately suppress hunting oscillation by setting the first temperature to 10 degrees since it is easy for a response delay to occur in the hydraulic motor when the temperature of the hydraulic oil is equal to or lower than 10 degrees.

(9) Preferably, the first opening is 50%. It is possible for the control section to determine that the operator does not desire rapid deceleration and to execute the first control or the second control described above when the accelerator opening degree is less than 50%.

According to the present invention, it is possible to suppress occurrence of hunting oscillation.

BRIEF DESCRIPTION OF DRAWINGS

FIG. 9 is a table illustrating correction amounts by PID control.

DESCRIPTION OF THE EMBODIMENTS

Figure 1:
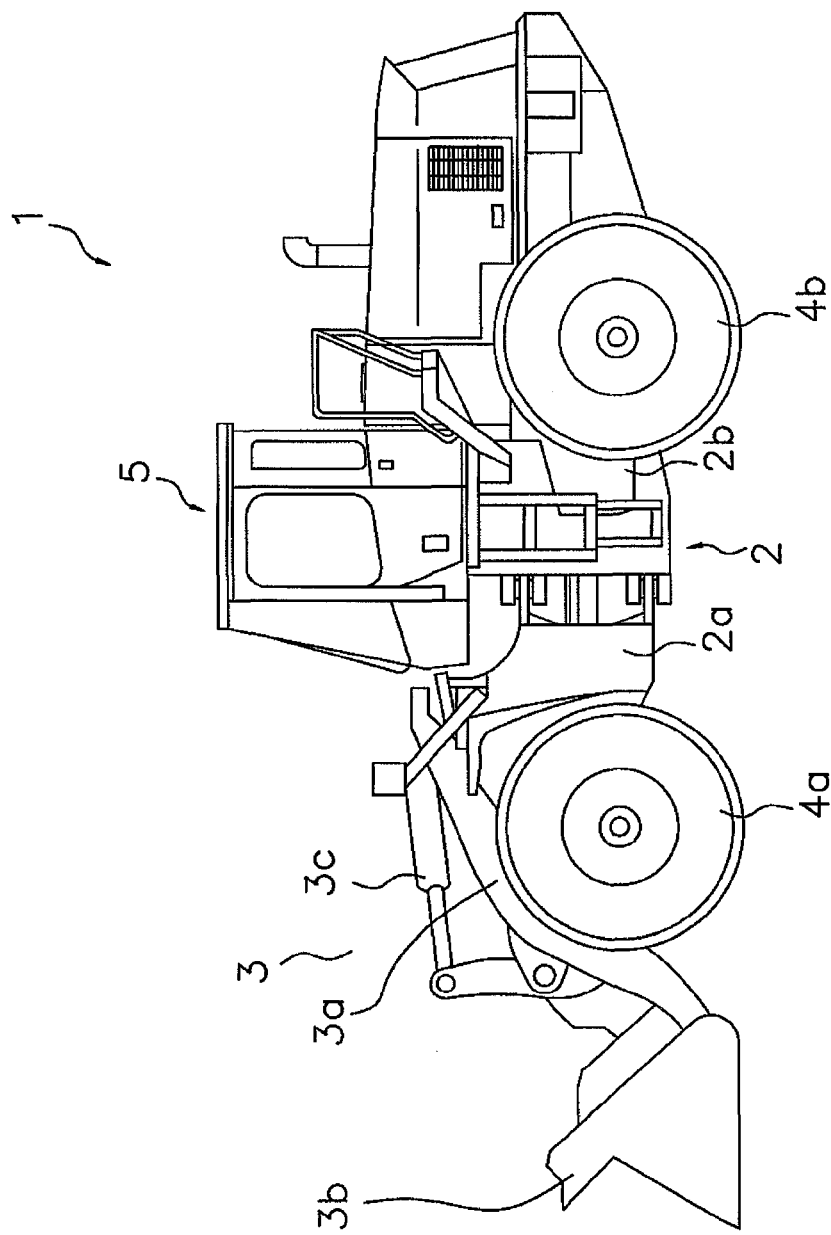
FIG. 1 is a side view of a wheel loader.

Below, an embodiment of a wheel loader according to the present invention is described with reference to the diagrams. FIG. 1 is a side view of a wheel loader 1.

Overall Configuration

As shown in FIG. 1, the wheel loader 1 is self-propelled using tires 4a and 4b and is able to perform desired work using a work implement 3. The wheel loader 1 is provided with a vehicle body frame 2, the work implement 3, the tires 4a and 4b, and a cab 5.

The vehicle body frame 2 has a front frame 2a which is arranged at the front side and a rear frame 2b which is arranged at the rear side, the front frame 2a and the rear frame 2b are joined at the center of the vehicle body frame 2 so as to be able to slide in the left and right direction.

The work implement 3 and a pair of front tires 4a are attached to the front frame 2a. The work implement 3 is an apparatus which is driven by hydraulic oil from a second hydraulic pump 14 (refer to FIG. 2), and has a lifting arm 3a which is mounted at the front section of the front frame 2a, a bucket 3b which is attached to a front end of the lifting arm 3a, a lifting cylinder (not shown) which drives the lifting arm 3a, and a tilt cylinder 3c which drives the bucket 3b. The pair of front tires 4a are provided on a side surface of the front frame 2a.

The cab 5, the pair of rear tires 4b, and the like are provided in the rear frame 2b. The cab 5 is mounted on an upper section of the rear frame 2b, an operation section such as a steering wheel and an accelerator pedal, a display section which displays various kinds of information such as speed, a seat, and the like are inbuilt into the cab 5. The pair of rear tires 4b are provided on a side surface of the rear frame 2b.

Figure 2:
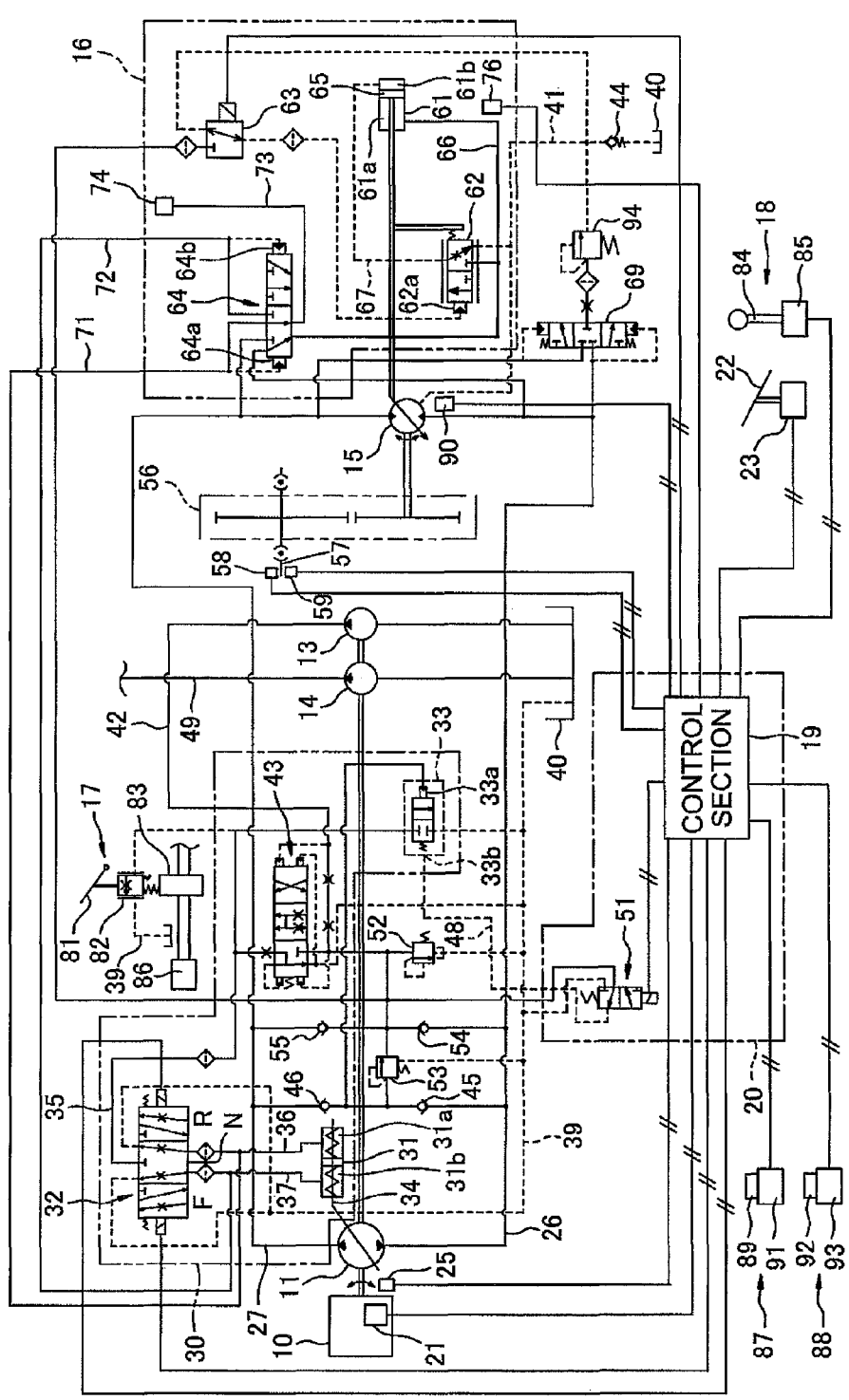
FIG. 2 is a diagram illustrating a configuration of a hydraulic drive mechanism.

In addition, the tires 4a and 4b which are moving wheels and a hydraulic drive mechanism for driving the work implement 3 are mounted in the vehicle body frame 2. Below, the configuration of the hydraulic drive mechanism will be described based on FIG. 2. FIG. 2 is a hydraulic circuit diagram illustrating the configuration of the hydraulic drive mechanism.

Hydraulic Drive Mechanism

As shown in FIG. 2, the hydraulic drive mechanism has an engine 10, a first hydraulic pump 11 for providing movement, a pump capacity control section 30, a charging pump 13, the second hydraulic pump 14 for the work implement, a hydraulic motor 15 for providing movement, a motor capacity control section 16, an inching operation section 17, a forward and reverse switching operation section 18, a control section 19 and the like as main components. In the hydraulic drive mechanism, an HST circuit which is a closed circuit is configured by the first hydraulic pump 11 and the hydraulic motor 15.

The engine 10 is a diesel engine, and output torque which is generated by the engine 10 is transmitted to the first hydraulic pump 11, the charging pump 13, the second hydraulic pump 14, and the like. A fuel injection apparatus 21 which controls the output torque and the rotations of the engine 10 is attached to the engine 10. The fuel injection apparatus 21 adjusts a rotation command value of the engine 10 according to an operation amount of an acceleration pedal 22, that is, the opening degree of the acceleration pedal 22 (referred to below as "accelerator opening degree"), and adjusts the fuel injection amount. The acceleration pedal 22 is a means for instructing target rotations of the engine 10 and is provided with an accelerator opening detecting section 23. The accelerator opening detecting section 23 is configured with a potentiometer or the like and the accelerator opening detecting section 23 detects the accelerator opening degree.

The accelerator opening detecting section 23 sends an opening signal which indicates the accelerator opening degree to the control section 19 and the accelerator opening detecting section 23 outputs the command signal from the control section 19 to the fuel injection apparatus 21. As a result, it is possible to control the rotations of the engine 10 by the operator adjusting the operation amount of the acceleration pedal 22. In addition, an engine rotation detecting section 25, which is formed from a rotation sensor which detects the actual rotations of the engine 10, is provided in the engine 10. A detecting signal which expresses the engine rotations is input into the control section 19 from the engine rotation detecting section 25.

The first hydraulic pump 11 is a variable capacity hydraulic pump where it is possible to change capacity by changing an inclining angle of a swash plate and the first hydraulic pump 11 is driven by the engine 10. Hydraulic oil which is discharged from the first hydraulic pump 11 passes through movement circuits 26 and 27 and is sent to the hydraulic motor 15. The movement circuit 26 is a flow path (referred to below as "a forward movement circuit 26") which supplies hydraulic oil to the hydraulic motor 15 such that the hydraulic motor 15 is driven in a direction where the vehicle moves forward. The movement circuit 27 is a flow path (referred to below as "a reverse movement circuit 27") which supplies hydraulic oil to the hydraulic motor 15 such that the hydraulic motor 15 is driven in a direction where the vehicle reverses.

The pump capacity control section 30 controls the capacity of the first hydraulic pump 11 by changing the inclining angle of the swash plate of the first hydraulic pump 11. The pump capacity control section 30 has a pump capacity control cylinder 31, an electromagnetic direction control valve 32, a cut-off valve 33, and the like.

The pump capacity control cylinder 31 moves a piston 34 according to the pressure of the hydraulic oil which is supplied. The pump capacity control cylinder 31 has a first oil chamber 31a and a second oil chamber 31b, and the position of the piston 34 is changed by the balance between the hydraulic pressure in the first oil chamber 31a and the hydraulic pressure in the second oil chamber 31b. The piston 34 is joined to the swash plate of the first hydraulic pump 11 and the inclining angle of the swash plate is changed by the movement of the piston 34.

The electromagnetic direction control valve 32 is an electromagnetic control valve which controls the pump capacity control cylinder 31 based on a command signal from the control section 19. It is possible for the electromagnetic direction control valve 32 to control the supply direction of the hydraulic oil to the pump capacity control cylinder 31 based on a command signal from the control section 19. Accordingly, it is possible for the control section 19 to change the discharge direction of the hydraulic oil of the first hydraulic pump 11 by electrically controlling the electromagnetic direction control valve 32. The electromagnetic direction control valve 32 switches between a forward state F, a reverse state R, and a neutral state N.

In the forward state F, the electromagnetic direction control valve 32 links a first pilot circuit 36 and a main pilot circuit 35 which will be described later, and the electromagnetic direction control valve 32 connects a second pilot circuit 37 and a drain circuit 39. The drain circuit 39 is connected with a tank 40. The first pilot circuit 36 is connected with the first oil chamber 31a of the pump capacity control cylinder 31. The second pilot circuit 37 is connected with the second oil chamber 31b of the pump capacity control cylinder 31. As a result, in a case where the electromagnetic direction control valve 32 is in the forward state F, hydraulic oil is supplied to the first oil chamber 31a via the main pilot circuit 35 and the first pilot circuit 36 and the hydraulic oil is discharged from the second oil chamber 31b. Due to this, the inclining angle of the first hydraulic pump 11 is changed to a direction where the capacity of the hydraulic oil to the movement circuit 26 increases.

In addition, in the reverse state R, the electromagnetic direction control valve 32 links the second pilot circuit 37 and the main pilot circuit 35, and the electromagnetic direction control valve 32 connects the first pilot circuit 36 and the drain circuit 39. As a result, in a case where the electromagnetic direction control valve 32 is in the reverse state R, hydraulic oil is supplied to the second oil chamber 31b via the main pilot circuit 35 and the second pilot circuit 37. Due to this, the inclining angle of the first hydraulic pump 11 is changed to a direction where the capacity of the hydraulic oil to the movement circuit 27 increases. Here, in a case where the electromagnetic direction control valve 32 is in the neutral state N, the first pilot circuit 36 and the second pilot circuit 37 are both connected with the drain circuit 39.

The charging pump 13 is a fixed capacity pump which is driven by the engine 10 and discharges hydraulic oil. The hydraulic oil which is discharged from the charging pump 13 is supplied to the electromagnetic direction control valve 32 via a charging circuit 42, an engine sensing valve 43 and the main pilot circuit 35. The charging pump 13 supplies hydraulic oil for activating the pump capacity control cylinder 31 with regard to the electromagnetic direction control valve 32. The engine sensing valve 43 converts hydraulic pressure from the charging pump 13 to hydraulic pressure according to the engine rotations. Accordingly, the engine sensing valve 43 changes the hydraulic pressure in the main pilot circuit 35 according to the engine rotations. In detail, the engine sensing valve 43 increases the hydraulic pressure of the main pilot circuit 35 when the engine rotations increase. The capacity of the first hydraulic pump 11 described above is increased or decreased by changing the hydraulic pressure of the main pilot circuit 35 using the engine sensing valve 43.

The cut-off valve 33 is connected with the main pilot circuit 35. The first pilot port 33a of the cut-off valve 33 is connected with the forward movement circuit 26 via a checking valve 45 and the first pilot port 33a of the cut-off valve 33 is connected with the reverse movement circuit 27 via a checking valve 46. The second pilot port 33b of the cut-off valve 33 is connected with the charging circuit 42 via a cut-off pilot circuit 48 and a cut-off pressure control valve 51 which will be described later.

The cut-off valve 33 is switched between a closed state and an open state according to the hydraulic pressure of the movement circuits 26 and 27 (referred to below as "hydraulic drive pressure"). Due to this, the cut-off valve 33 limits the hydraulic drive pressure so as not to exceed a cut-off pressure value which is set. In detail, the cut-off valve 33 reduces the hydraulic pressure of the main pilot circuit 35 (referred to below as "main pilot circuit pressure") by connecting the main pilot circuit 35 and the drain circuit 39 in a case where the hydraulic drive pressure is equal to or more than the cut-off pressure value which is set. When the pressure of the main pilot circuit 35 is reduced, the pilot pressure, which is supplied to the pump capacity control cylinder 31 via the electromagnetic direction control valve 32, is reduced. As a result, the capacity of the first hydraulic pump 11 is reduced and the hydraulic drive pressure is reduced. Due to this, the pump capacity control section 30 controls the capacity of the first hydraulic pump 11 so that the hydraulic drive pressure does not exceed the predetermined cut-off pressure value. In addition, it is possible for the cut-off valve 33 to change the cut-off pressure according to the pilot pressure which is supplied to the second pilot port 33b.

The cut-off pressure control valve 51 is an electromagnetic control valve which is electrically controlled using a command signal from the control section 19 and the cut-off pressure control valve 51 is switched between two stages of an energized state and a non-energized state. In the energized state, the cut-off pressure control valve 51 connects the cut-off pilot circuit 48 and the drain circuit 39. Due to this, hydraulic oil is discharged from the second pilot port 33b of the cut-off valve 33 and the cut-off pressure of the cut-off pressure valve 33 is a predetermined low-pressure value. In the non-energized state, the cut-off pressure control valve 51 connects the charging circuit 42 and the cut-off pilot circuit 48. Due to this, hydraulic oil is supplied to the second pilot port 33b of the cut-off valve 33 and the cut-off pressure of the cut-off pressure valve 33 is set to be a predetermined high-pressure value. In this manner, it is possible for the cut-off pressure control valve 51 to control the pilot pressure which is supplied to the second pilot port 33b of the cut-off valve 33 according to the command signal which is input from the control section 19.

Here, the charging circuit 42 is connected with the drain circuit 39 via a first relief valve 52. The first relief valve 52 limits the hydraulic pressure of the charging circuit 42 so as not to exceed a predetermined relief pressure. In addition, the charging circuit 42 is connected with the movement circuits 26 and 27 via a second relief valve 53 and checking valves 54 and 55. The second relief valve 53 connects the charging circuit 42 and the movement circuits 26 and 27 in a case where the hydraulic drive pressure has reached a predetermined relief pressure. Due to this, the second relief valve 53 limits the hydraulic pressure of the movement circuits 26 and 27 so as not to exceed the predetermined relief pressure.

The second hydraulic pump 14 is driven by the engine 10. Hydraulic oil which is discharged from the second hydraulic pump 14 is sent to the tilt cylinder 3c and the like (refer to FIG. 1) via a work implement circuit 49 and the tilt cylinder 3c and the like are driven.

The hydraulic motor 15 is the hydraulic motor 15 which has a variable capacity where it is possible to change the capacity by changing the inclining angle of an inclined shaft. The hydraulic motor 15 is driven using hydraulic oil which is discharged from the first hydraulic pump 11 and supplied via the movement circuits 26 and 27. Due to this, the hydraulic motor 15 generates drive force for movement. The hydraulic motor 15 is driven in a direction where the vehicle moves forward by hydraulic oil being supplied via the forward movement circuit 26. The hydraulic motor 15 is driven in a direction where the vehicle reverses by hydraulic oil being supplied via the reverse movement circuit 27. In addition, the hydraulic motor 15 is connected with the drain circuit 41 which will be described later. The hydraulic motor 15 is provided with an oil temperature detecting section 90 which is formed from a temperature sensor detecting the temperature of the hydraulic oil which is discharged from the hydraulic motor 15. That is, the oil temperature detecting section 90 detects the oil temperature which is supplied to the hydraulic motor 15. The oil temperature detecting section 90 outputs a temperature signal to the control section 19. The temperature signal indicates the temperature of the hydraulic oil which is detected. Here, it is sufficient if the oil temperature detecting section 90 detects the temperature of the hydraulic oil which is supplied to the hydraulic motor 15 and the mounting position of the oil temperature detecting section 90 is not particularly limited.

The drive force of the hydraulic motor 15 is transferred to an output shaft 57 via a transfer 56. Due to this, the vehicle moves due to the rotation of the tires 4a and 4b. In addition, an output rotation detecting section 58 is provided in the output shaft 57. The output rotation detecting section 58 is formed from a rotation sensor which detects the rotations and rotation direction of the output shaft 57. Information which is detected by the output rotation detecting section 58 is sent to the control section 19 as a detection signal. It is possible for the control section 19 to determine whether the vehicle is moving forward, is reversing, or is stationary based on the rotations of the output shaft 57 which is detected by the output rotation detecting section 58. Accordingly, the output rotation detecting section 58 functions as a forward and reverse detecting section which detects whether the vehicle is moving forward or reversing.

In addition, the output shaft 57 is provided with a vehicle speed detecting section 59. The vehicle speed detecting section 59 detects the vehicle speed of the wheel loader 1. The vehicle speed detecting section 59 detects the vehicle speed of the wheel loader 1 based on, for example, the rotation speed of the output shaft 57 or the like. The vehicle speed detecting section 59 outputs a vehicle speed signal to the control section 19. The vehicle speed signal indicates the vehicle speed which is detected. Here, it is also possible for the vehicle speed detecting section 59 to be omitted. For example, the control section 19 may calculate the vehicle speed of the wheel loader 1 based on the rotations of the output shaft which is detected by the output rotation detecting section 58.

The motor capacity control section 16 controls the capacity of the hydraulic motor 15 (referred to below as "motor capacity") by controlling the inclining angle of the inclined shaft of the hydraulic motor 15. The motor capacity control section 16 has a motor capacity control cylinder 61, a motor capacity control valve 62, a pilot pressure control valve 63, a forward and reverse switching valve 64, and the like.

The motor capacity control cylinder 61 moves a piston 65 according to the pressure of hydraulic oil which is supplied. The motor capacity control cylinder 61 has a first oil chamber 61a and a second oil chamber 61b. The position of the piston 65 changes according to the balance between the hydraulic pressure in the first oil chamber 61a and the hydraulic pressure in the second oil chamber 61b. The piston 65 is joined to the inclined shaft of the hydraulic motor 15 and the inclining angle of the inclined shaft is changed by the movement of the piston 65.

The motor capacity control valve 62 controls the motor capacity control cylinder 61 based on the pilot pressure which is supplied. The motor capacity control valve 62 is switched between a first state and a second state based on the pilot pressure which is supplied to a pilot port 62a. In the first state, the motor capacity control valve 62 connects a first motor cylinder circuit 66 and a second motor cylinder circuit 67. The first motor cylinder circuit 66 is a circuit which connects the forward and reverse switching valve 64 and the first oil chamber 61a of the motor capacity control cylinder 61. The second motor cylinder circuit 67 is a circuit which connects the motor capacity control valve 62 and the second oil chamber 61b of the motor capacity control cylinder 61.

In a case where the motor capacity control valve 62 is in the first state, hydraulic oil is also supplied to the second oil chamber 61b of the motor capacity control cylinder 61. The hydraulic pressure in the first oil chamber 61a and the hydraulic pressure in the second oil chamber 61b are the same but the pressurizing force which acts on the piston 65 increases the hydraulic pressure in the second oil chamber 61b to the extent of the cross sectional area of the piston rod. Due to this, the piston 65 of the motor capacity control cylinder 61 moves such that the motor capacity is reduced. In a case where the motor capacity control valve 62 is in the second state, the motor capacity control valve 62 connects the second motor cylinder circuit 67 and the drain circuit 41. The drain circuit 41 is connected with the tank 40 via a checking valve 44. As a result, hydraulic oil is discharged from the second oil chamber 61b of the motor capacity control cylinder 61. Due to this, the piston 65 of the motor capacity control cylinder 61 moves so that the motor capacity is increased. As above, the motor capacity control valve 62 controls the direction and the flow amount of hydraulic oil supplied to the motor capacity control cylinder 61 based on the pilot pressure which is supplied to the pilot port 62a. Due to this, it is possible for the motor capacity control valve 62 to control the motor capacity based on the pilot pressure.

The pilot pressure control valve 63 controls the supply and discharge of hydraulic oil to and from the pilot port 62a of the motor capacity control valve 62. The pilot pressure control valve 63 supplies hydraulic oil in the charging circuit 42 to the pilot port 62a. In addition, the pilot pressure control valve 63 discharges hydraulic oil from the pilot port 62a to the tank 40. It is possible for the pilot pressure control valve 63 to arbitrarily control the hydraulic pressure which is supplied to the pilot port 62a of the motor capacity control valve 62 according to a command signal from the control section 19. Accordingly, it is possible for the control section 19 to arbitrarily control the capacity for hydraulic oil in the hydraulic motor 15 by electrically controlling the pilot pressure control valve 63. Here, a low-pressure switching valve 69 connects the movement circuit on the low pressure side out of the movement circuits 26 and 27 with the tank 40 via a relief valve 94.

The forward and reverse switching valve 64 supplies hydraulic oil in the movement circuit on the high pressure side out of the movement circuits 26 and 27 to the motor capacity control cylinder 61. In detail, in a case where the electromagnetic direction control valve 32 is in the forward state F, hydraulic oil is supplied to a forward pilot port 64a in the forward and reverse switching valve 64 via a forward pilot circuit 71 which is connected with the first pilot circuit 36. Due to this, the forward and reverse switching valve 64 is in the forward state F. In the forward state F, the forward and reverse switching valve 64 connects the forward movement circuit 26 and the first motor cylinder circuit 66 and connects the forward pilot circuit 71 and a hydraulic pressure detecting circuit 73. Due to this, hydraulic oil in the forward movement circuit 26 is supplied to the motor capacity control cylinder 61. In addition, the hydraulic pressure detecting circuit 73 is connected with a pilot circuit hydraulic pressure detecting section 74 which is formed from a hydraulic pressure sensor. Accordingly, the hydraulic pressure in the forward pilot circuit 71 is detected using the pilot circuit hydraulic pressure detecting section 74.

In addition, in a case where the electromagnetic direction control valve 32 is in the reverse state R, hydraulic oil is supplied to a reverse pilot port 64b in the forward and reverse switching valve 64 via a reverse pilot circuit 72 which is connected with the second pilot circuit 37. Due to this, the forward and reverse switching valve 64 is on the reverse state R. In the reverse state R, the forward and reverse switching valve 64 connects the reverse movement circuit 27 and the first motor cylinder circuit 66 and connects the reverse pilot circuit 72 and the hydraulic pressure detecting circuit 73. Due to this, hydraulic oil in the reverse movement circuit 27 is supplied to the motor capacity control cylinder 61. In addition, the hydraulic pressure in the reverse pilot circuit 72 is detected by the pilot circuit hydraulic pressure detecting section 74. The pilot circuit hydraulic pressure detecting section 74 detects the hydraulic pressure in the forward pilot circuit 74 or the hydraulic pressure in the reverse pilot circuit 72, that is, The pilot circuit hydraulic pressure detecting section 74 detects the main pilot circuit pressure and sends this to the control section 19 as a detection signal.

Here, the hydraulic pressure of the first motor cylinder circuit 66, that is, the hydraulic drive pressure of the movement circuit on the high pressure side which drives the hydraulic motor 15, is detected by a hydraulic drive pressure detecting section 76. The hydraulic drive pressure detecting section 76 sends the hydraulic drive pressure to the control section 19 as a detection signal.

The inching operation section 17 has an inching pedal 81 and an inching valve 82. The inching pedal 81 is provided in the cab 5 and is operated by an operator. The inching valve 82 connects the main pilot circuit 35 and the drain circuit 39 when the inching pedal 81 is operated. Due to this, the inching valve 82 reduces the main pilot circuit pressure according to the operation amount of the inching pedal 81. The inching operation section 17 is used when, for example, there is a desire to increase the rotations of the engine 10 but there is a desire to suppress increases in movement speed and the like. That is, the main pilot circuit pressure is also increased when the rotations of the engine 10 are increased due to pressing downward on the acceleration pedal 22. At this time, it is possible to suppress increases in the main pilot circuit pressure by operating the inching pedal 81 and opening the inching valve 82. Due to this, it is possible to suppress increases in the capacity of the first hydraulic pump 11 and to suppress increases in the rotation speed of the hydraulic motor 15.

In addition, a brake valve 83 is joined to the inching valve 82 via a spring. The brake valve 83 controls the supply of hydraulic oil to a hydraulic brake apparatus 86. The inching pedal 81 is also used as an operating member for the hydraulic brake apparatus 86. Only the inching valve 82 is operated until the operation amount of the inching pedal 81 reached a predetermined amount. Then, the operation of the brake valve 83 starts when the operation amount of the inching pedal 81 reaches the predetermined amount, and due to this, braking force is generated in the hydraulic brake apparatus 86. Braking force is controlled in the hydraulic brake apparatus 86 according to the operation amount of the inching pedal 81 when the operation amount of the inching pedal 81 is equal to or more than the predetermined amount.

The forward and reverse switching operation section 18 has a forward and reverse switching lever 84 as a forward and reverse switching operation member and a lever operation detecting section 85 as an operation detecting section. The forward and reverse switching lever 84 is provided in the cab 5 and is operated by an operator in order to instruct switching of the movement state of the vehicle. Here, the movement state of the vehicle is switched to any state out of the forward state, the reverse state, or the neutral state due to a switching operation of the forward and reverse switching lever 84. In more detail, the forward and reverse switching lever 84 is switched to a forward position, a reverse position, or a neutral position. The lever operation detecting section 85 detects a switching instruction by the forward and reverse switching lever 84. In more detail, the lever operation detecting section 85 detects whether the forward and reverse switching lever 84 is positioned at either the forward position, the reverse position, or the neutral position. In addition, the lever operation detecting section 85 sends the detection result to the control section 19 as a switching instruction signal.

A traction control operation section 87 and a maximum speed variable control operation section 88 are provided in the cab 5. The traction control operation section 87 has a traction selection member 89 with, for example, a dial format and a first position detecting section 91 which detects the selection position of the traction selection member 89. The first position detecting section 91 sends the selection position which is detected to the control section 19 as a detection signal. The traction selection member 89 is operated in order to set the maximum traction force using traction control which will be described later. The maximum speed variable control operation section 88 has a speed level selection member 92 with, for example, a dial format and a second position detecting section 93. The speed level selection member 92 is operated in order to set the maximum speed using maximum speed variable control which will be described later. The second position detecting section 93 detects the selection position of the speed level selection member 92. The second position detecting section 93 sends the selection position which is detected to the control section 19 as a speed level signal.

The control section 19 is an electronic control section which has a CPU, various types of memory, and the like and electrically controls various types of electromagnetic control valves and the fuel injection apparatus 21 based on output signals from each of the detecting sections. Due to this, the control section 19 controls the engine rotations, the motor capacity, and the like. For example, the control section 19 processes the detection signals from the engine rotation detecting section 25 and the hydraulic drive pressure detecting section 76, and outputs a motor capacity command signal to the pilot pressure control valve 63.

Figure 3:
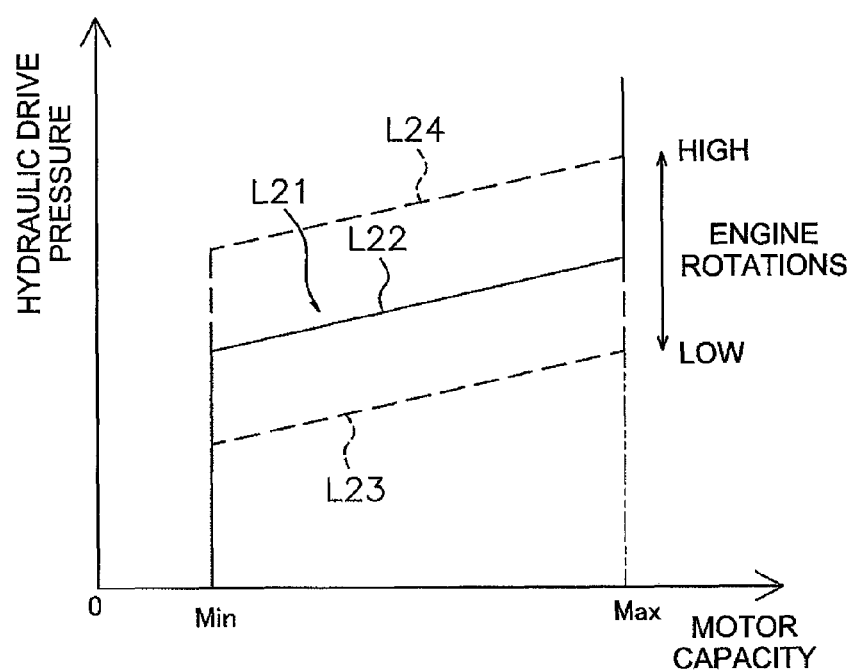
FIG. 3 is a diagram illustrating an example of a feature of motor capacity and hydraulic drive.
Figure 5:
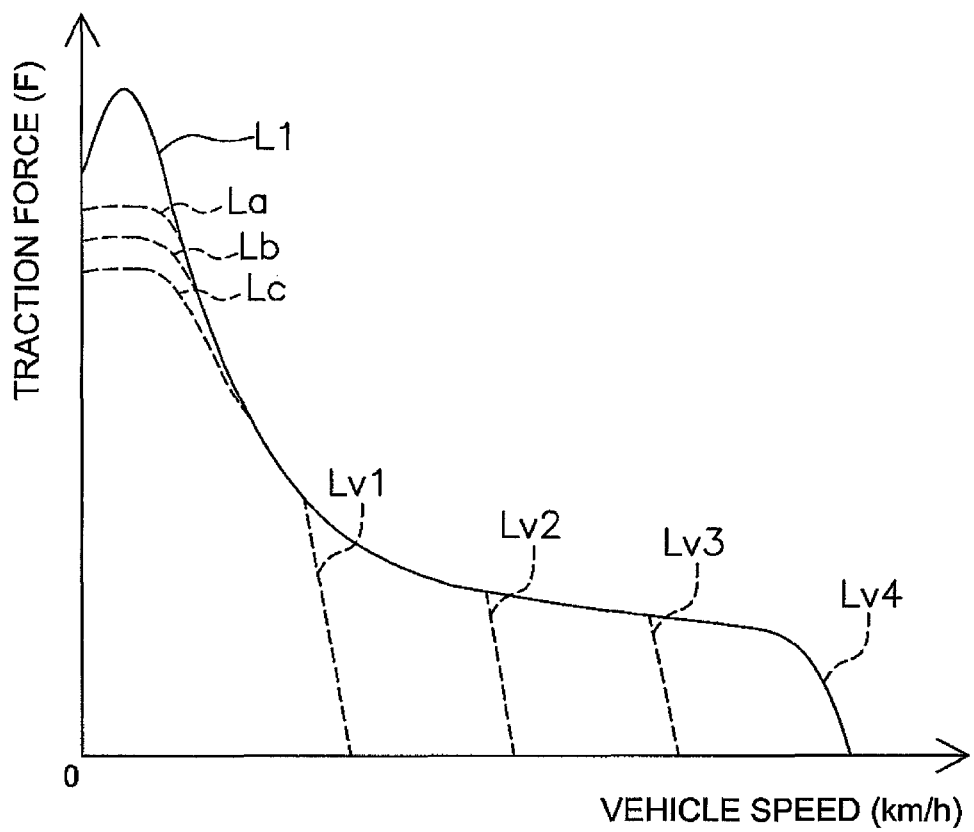
FIG. 5 is a diagram illustrating a feature of vehicle and speed traction using traction control and maximum speed variable control.

Here, the control section 19 sets a command signal from the values of the engine rotations and the hydraulic drive pressure so that motor capacity-hydraulic drive pressure characteristics are acquired as shown in FIG. 3 using load control which will be described later. The control section 19 outputs the command signal to the pilot pressure control valve 63. A solid line L21 in FIG. 3 is a line which indicates the motor capacity with regard to the hydraulic drive pressure in a state where the engine rotations are a certain value. The motor capacity is at the minimum (Min) until a case where the hydraulic drive pressure is equal to or less than a specific value, and after that, the motor capacity gradually increases in accompaniment with increases in the hydraulic drive pressure (an inclined portion L22 with a solid line). After the motor capacity reaches the maximum (Max), the motor capacity is maintained at the maximum capacity Max even if the hydraulic pressure increases. The inclined portion L22 with a solid line described above is set so as to move up or down according to the engine rotations. That is, if the engine rotations are low, the motor capacity is controlled so as to increase from a state where the hydraulic drive pressure is lower and reach the maximum capacity in a state where the hydraulic drive pressure is lower (refer to an inclined portion L23 with a dashed line at the lower side in FIG. 3). Conversely, if the engine rotations are high, the motor capacity is controlled so as to be maintained at the minimum capacity Min until the hydraulic drive pressure is higher and to reach the maximum capacity in a state where the hydraulic drive pressure is higher (refer to an inclined portion L24 with a dashed line at the upper side in FIG. 3). Due to this, it is possible to automatically change speed in the wheel loader 1 without an operation to change speed from a vehicle speed of zero to the maximum speed by the traction force and the vehicle speed being changed in a stepless manner (refer to line L1 in FIG. 5).

For example, when forward is selected using the forward and reverse switching lever 84, hydraulic oil which is discharged from the charging pump 13 is supplied to the first pilot circuit 36 via the charging circuit 42, the engine sensing valve 43, the main pilot circuit 35, and the electromagnetic direction control valve 32. The piston 34 of the pump capacity control cylinder 31 changes the angle of the swash plate in the first hydraulic pump 11 by being moved in the left direction in FIG. 2 by hydraulic oil from the first pilot circuit 36. At this time, the inclining angle of the swash plate in the first hydraulic pump 11 is changed to a direction which increases the capacity of the hydraulic oil to the forward movement circuit 26. In addition, in this state, the second pilot circuit 37 is connected with the drain circuit 39 by the electromagnetic direction control valve 32.

Hydraulic oil in the first pilot circuit 36 is supplied to the forward pilot port 64*a* of the forward and reverse switching valve 64 via the forward pilot circuit 71. Due to this, the forward and reverse switching valve 64 is in the forward state F. In this state, the forward movement circuit 26 and the first motor cylinder circuit 66 are connected and hydraulic oil in the forward movement circuit 26 is supplied to the motor capacity control cylinder 61. In addition, hydraulic pressure in the forward movement circuit 26 is detected by the hydraulic drive pressure detecting section 76 and is sent to the control section 19 as a detection signal. In addition, with the forward and reverse switching valve 64 in the forward state F, the forward pilot circuit 71 and the hydraulic pressure detecting circuit 73 are connected and hydraulic pressure in the forward pilot circuit 71 is detected by the pilot circuit hydraulic pressure detecting section 74. The pilot circuit hydraulic pressure detecting section 74 sends the hydraulic pressure in the forward pilot circuit 71 which is detected to the control section 19 as a detection signal.

Figure 7:
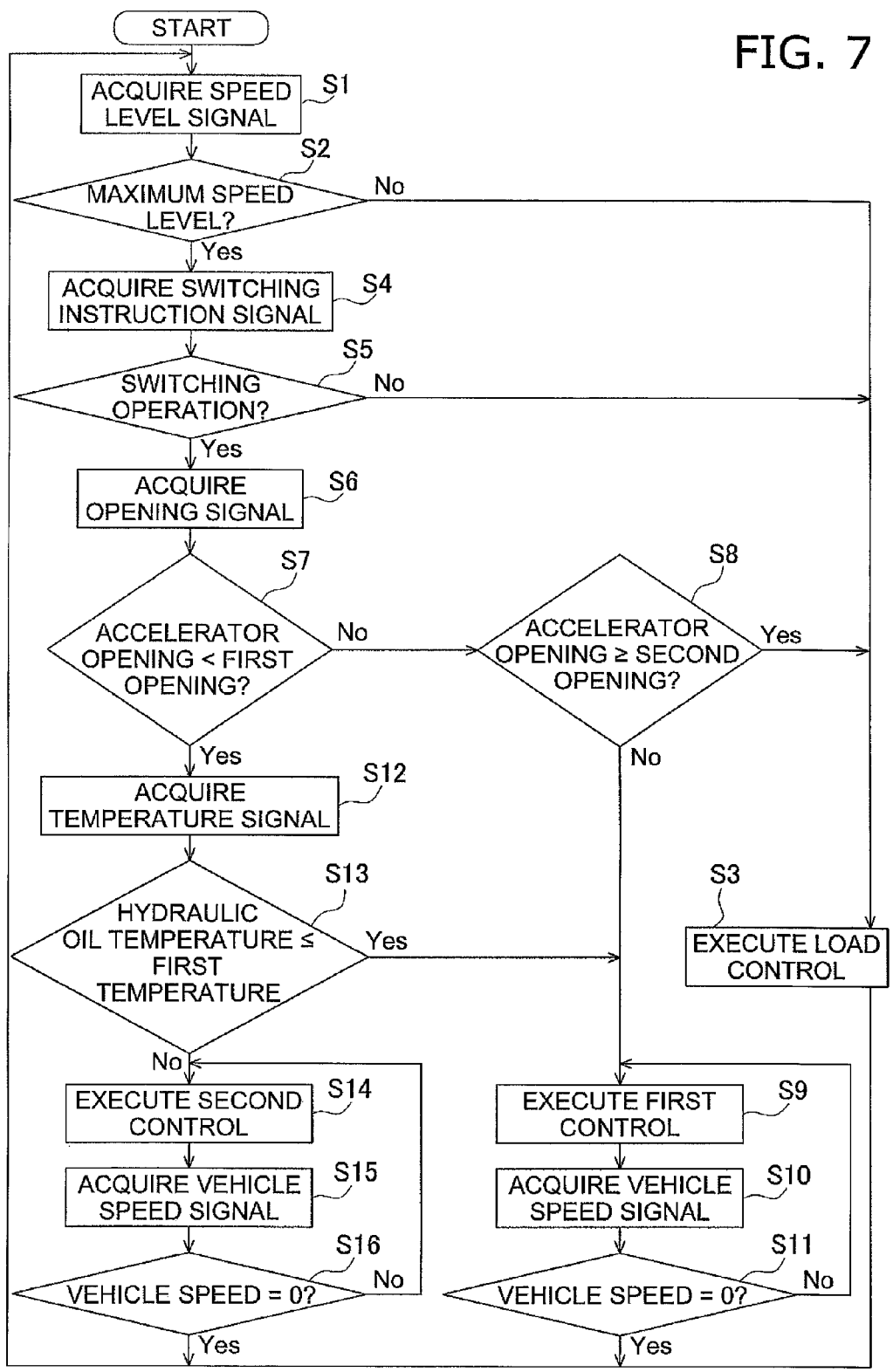
FIG. 7 is a flow chart illustrating an example of a control method using the control section.

As described above, the control section 19 calculates an electric current value of a command signal based on the engine rotations and the hydraulic drive pressure, that is, the hydraulic pressure in the forward movement circuit 26 (refer to FIG. 7). Then, the control section 19 sends a command signal which has the electric current value, which is calculated, to the pilot pressure control valve 63. The pilot pressure control valve 63 controls the pressure of hydraulic oil which is supplied to the pilot port 62*a* of the motor capacity control valve 62 based on the command signal from the control section 19. Due to this, the motor capacity control valve 62 is controlled and the position of the piston 65 of the motor capacity control cylinder 61 is adjusted. As a result, the inclining angle of the inclined shaft is adjusted so that the actual motor capacity is the command capacity which corresponds to the command signal.

Figure 4:
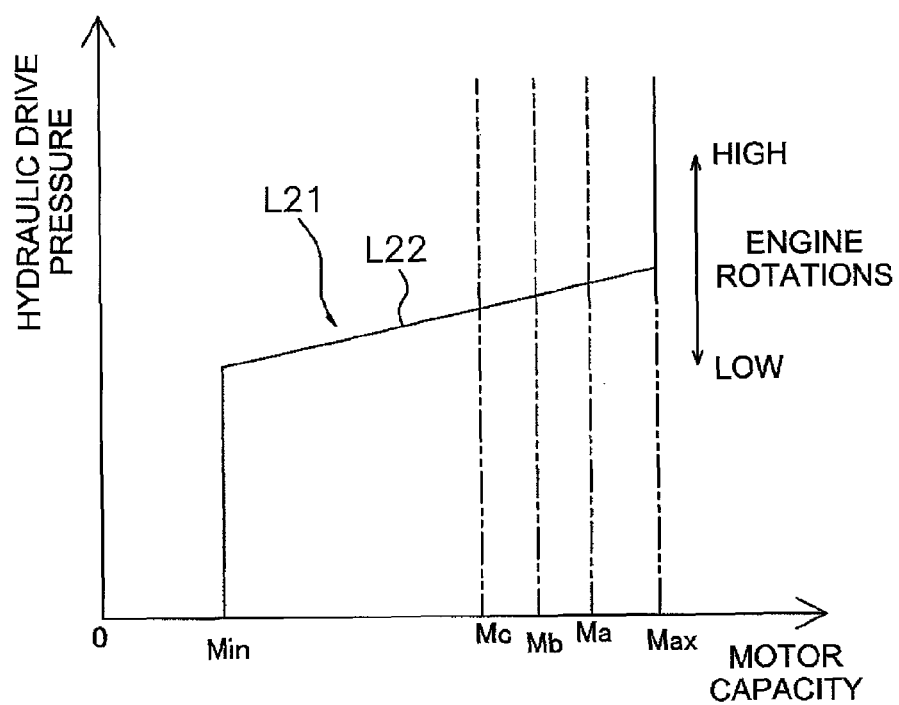
FIG. 4 is a diagram illustrating an example of a feature of motor capacity and hydraulic drive using traction control.

In addition, the control section 19 executes traction control due to operation of the traction selection member 89. Traction control is control where the maximum traction force of the vehicle is changed in a plurality of steps by changing the maximum capacity of the hydraulic motor 15. The control section 19 reduces the maximum capacity of the hydraulic motor 15 in a plurality of steps according to the operation of the traction selection member 89. In detail, a command signal is output to the pilot pressure control valve 63 as shown in FIG. 4 so that the maximum capacity is changed to either Ma, Mb, or Mc. When the maximum capacity is changed to Ma, the vehicle speed-traction force characteristics are changed as in line La in FIG. 5. In this manner, the maximum traction force is reduced compared to the line L1 which indicates the vehicle speed-traction force characteristics in a state where traction control is not performed. When the maximum capacity is changed to Mb, the vehicle speed-traction force characteristics are changed as in line Lb and the maximum traction force is further reduced. When the maximum capacity is changed to Mc, the vehicle speed-traction force characteristics are changed as in line Lc and the maximum traction force is further reduced.

Figure 6:
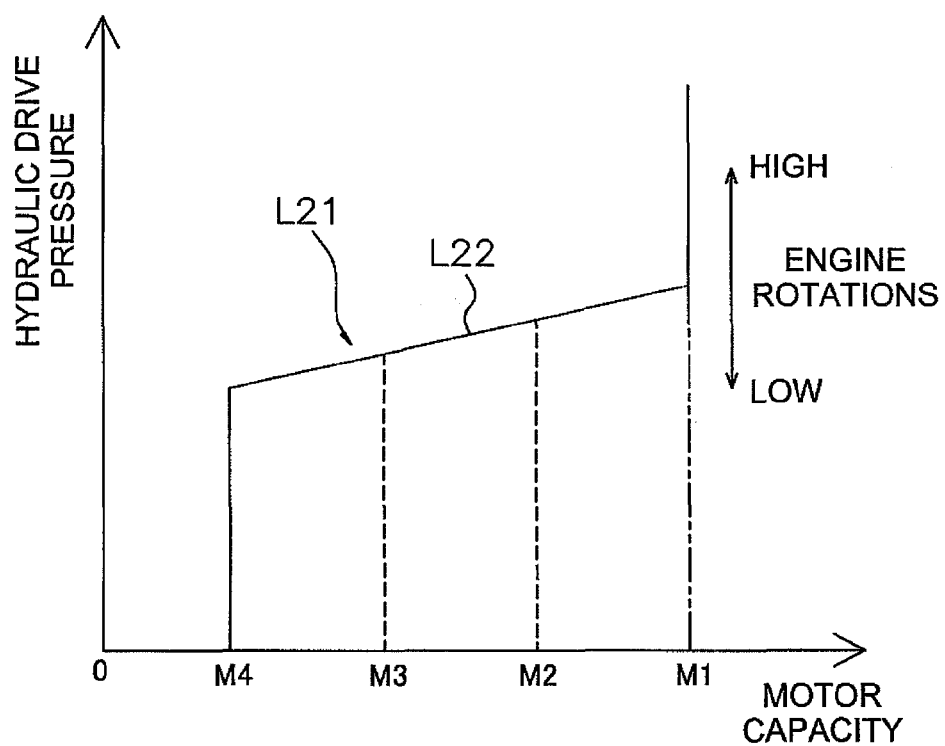
FIG. 6 is a diagram illustrating an example of a feature of motor capacity and hydraulic drive using maximum speed variable control.

In addition, the control section 19 executes maximum speed variable control due to operation of the speed level selection member 92. Maximum speed variable control is control where the maximum speed of the vehicle is changed in a plurality of steps by changing the minimum capacity of the hydraulic motor 15. The control section 19 increases the minimum capacity of the hydraulic motor 15 in a plurality of steps according to the operation of the speed level selection member 92. For example, in a case where the speed level selection member 92 is able to select 4 steps from a first speed to a fourth speed, the minimum capacity is changed in four steps from M1 to M4 as shown in FIG. 6. M1 is the minimum capacity which is set in a case where the first speed is selected. When the minimum capacity is set to M1, the vehicle speed-traction force characteristics are as line Lv1 in FIG. 5. M2 is the minimum capacity which is set in a case where the second speed is selected. When the minimum capacity is set to M2, the vehicle speed-traction force characteristics are as line Lv2 in FIG. 5. M3 is the minimum capacity which is set in a case where the third speed is selected. When the minimum capacity is set to M3, the vehicle speed-traction force characteristics are as line Lv3 in FIG. 5. M4 is the minimum capacity which is set in a case where the fourth speed is selected. When the minimum capacity is set to M4, the vehicle speed-traction force characteristics are as line Lv4 in FIG. 5. In this manner, the maximum speed increases in order from the first speed to the fourth speed.

Control Method of Control Section

Next, a motor capacity control method using the control section 19 will be described with reference to FIG. 7. FIG. 7 is a flow chart for describing the motor capacity control method using the control section 19. As shown in FIG. 7, the control section 19 acquires a speed level signal (step S1). In detail, the control section 19 acquires information which relates to the selection position of the speed level selection member 92 from the second position detecting section 93 as a speed level signal.

Next, the control section 19 determines whether or not the speed level which is selected is the maximum speed level based on the speed level signal which is acquired (step S2). Here, the control section 19 in the present embodiment determines whether the speed level which is selected is the fourth speed in the process in step S2.

When it is determined that the speed level which is selected is not the maximum speed level (No in step S2), the control section 19 executes load control (an example of the third control) (step S3). Load control is feedback control where the motor capacity control section 16 is controlled so that the hydraulic drive pressure which is detected by the hydraulic drive pressure detecting section 76 is closer to the predetermined target hydraulic drive pressure. Below, the details of load control will be described.

Figure 8:
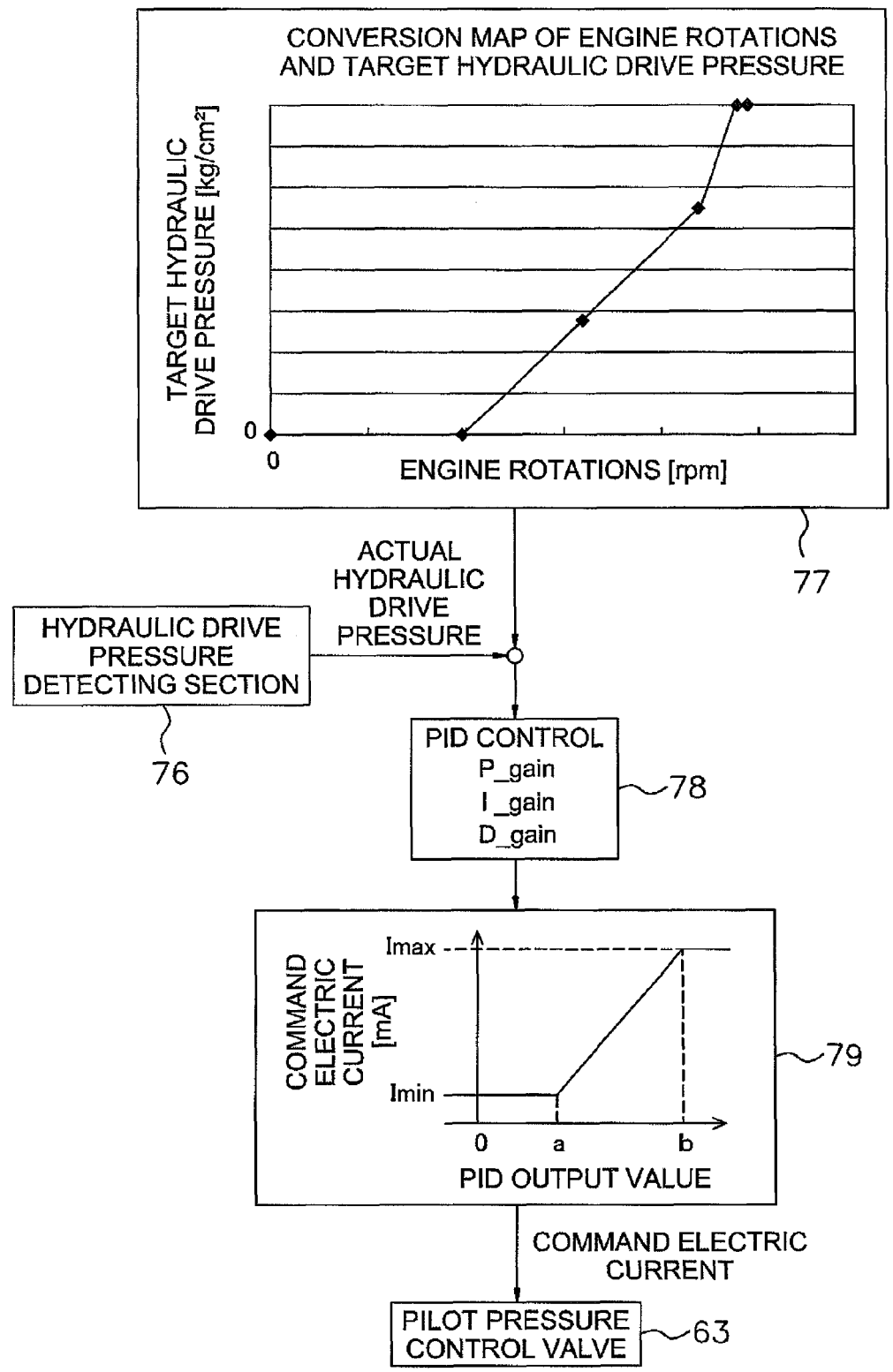
FIG. 8 is a functional block diagram which relates to load control of the control section.

As shown in FIG. 8, the control section 19 has a target hydraulic drive pressure calculating section 77, a PID control section 78, and a command current calculating section 79. The target hydraulic drive pressure calculating section 77 calculates the target hydraulic drive pressure from the engine rotations which are detected by the engine rotation detecting section 25. In detail, the target hydraulic drive pressure calculating section 77 stores an engine rotation-target hydraulic drive pressure conversion map as shown in FIG. 8 and calculates the target hydraulic drive pressure from the conversion map.

The PID control section 78 performs PID control with the target hydraulic drive pressure, which is calculated by the target hydraulic drive pressure calculating section 77, and the actual hydraulic drive pressure which is detected by the hydraulic drive pressure detecting section 76, as input values and the command current, which is input to the pilot pressure control valve 63, as an output value. The PID control section 78 calculates the output value based on the following formula.

(output value)=(−1)×((P_gain×deviation)+(I_gain× accumulated deviation)+(D_gain×(current deviation−previous deviation))

Here, the PID control section 78 uses fixed coefficients which are determined in advance as three P, I, and D gain values (P_gain, I_gain, and D_gain), but the gain values are corrected by subtracting a determined correction amount in a case where the temperature of the hydraulic oil which is detected by the oil temperature detecting section 90 is low. For example, as in FIG. 9, a1 is used as the correction amount of the P gain value and b1 is used as the correction amount of the I gain value in a case where the temperature of the hydraulic oil is T0 or T1. a2 which is smaller than a1 is used as the correction amount of the P gain value in a case where the temperature of the hydraulic oil is T2 and b2 which is smaller than b1 is used as the correction amount of the I gain value in a case where the temperature of the hydraulic oil is T2. The correction amount is zero in a case where the temperature of the hydraulic oil is T3 or more. That is, the gain values are not corrected. In addition, correction of the D gain value is not performed irrespective of the temperature of the hydraulic oil. Here, correction amounts at temperatures which are different to the temperatures shown in the table in FIG. 9 are determined using proportional calculations.

The command current calculating section 79 limits the range of the output value from the PID control section 78 to a predetermined range between a maximum value Imax and a minimum value Imin. The minimum value Imin is set at a value which corresponds to the maximum capacity which is set according to traction control when traction control is being executed. The maximum value Imax is set at a value which corresponds to the minimum capacity which is set according to maximum speed variable control when maximum speed variable control is being executed. Here, the command current is reduced as the motor capacity increases. Then, a command signal which has the current electric current which is calculated by the command current calculating section 79 is input into the pilot pressure control valve 63. Due to this, the motor capacity control section 16 is controlled so that the hydraulic drive pressure which is detected by the hydraulic drive pressure detecting section 76 is closer to the predetermined target hydraulic drive pressure.

Returning to FIG. 7, description of the control method of the control section 19 will continue. When it is determined that the speed level which is selected is the maximum speed level (Yes in step S2) in the process of step S2 described above, next, the control section 19 acquires a switching instruction signal (step S4). In detail, the control section 19 acquires the switching instruction signal which relates to whether the forward and reverse switching lever 84 is positioned at the forward position, the reverse position, or the neutral position.

The control section 19 determines whether or not a switching operation has been performed based on the switching instruction signal (step S5). In detail, the control section 19 determines whether or not the forward and reverse switching lever 84 has been switched from the forward position to the reverse position or the neutral position or whether or not the forward and reverse switching lever 84 has been switched from the reverse position to the forward position or the neutral position. When it is determined that a switching operation has not been performed (No in step S5), the control section 19 executes load control described above (step S3).

When it is determined that a switching operation has been performed (Yes in step S5), next, the control section 19 acquires an opening signal (step S6). In detail, the control section 19 acquires the opening signal which indicates the opening of the acceleration pedal 22 which is output from the accelerator opening detecting section 23. The control section 19 determines whether or not the accelerator opening degree is less than a first opening based on the opening signal (step S7). For example, the control section determines whether or not the accelerator opening degree is less than 50%.

When it is determined that the accelerator opening degree is equal to or more than the first opening (No in step S7), next, the control section 19 determines whether or not the accelerator opening degree is equal to or more than a second opening based on the opening signal which is acquired in step S6 (step S8). The second opening is larger than the first opening. For example, the control section 19 determines whether or not the accelerator opening degree is equal to or more than 85%.

When it is determined that the accelerator opening degree is equal to or more than the second opening (Yes in step S8), next, the control section 19 executes load control described above (step S3). In this case, since the hydraulic drive pressure increases immediately after the forward and reverse switching lever 84 is switched, the control section 19 controls the motor capacity control section 16 so as to increase the motor capacity. As a result, the wheel loader rapidly decelerates.

On the other hand, when it is determined that the accelerator opening degree is less than the second opening (No in step S8), the control section 19 executes a first control (step S9). When the first control is executed, the control section 19 controls the motor capacity control section 16 so that the motor capacity is maintained before and after the switching operation using the forward and reverse switching lever 84. In this case, the hydraulic drive pressure is increased immediately after the switching operation using the forward and reverse switching lever 84, but the motor capacity is maintained before and after the switching operation by the control section 19 executing the first control. As a result, speed is maintained without the wheel loader rapidly decelerating.

Next, the control section 19 acquires a vehicle speed signal (step S10). In detail, the control section 19 acquires the vehicle speed signal which is output from the vehicle speed detecting section 59. The control section 19 determines whether or not the vehicle speed of the wheel loader 1 is 0 km/h based on the vehicle speed signal (step S11).

When it is determined that the vehicle speed is not 0 km/h (No in step S11), the control section 19 executes a process of returning to step S9 described above. On the other hand, when it is determined that the vehicle speed is 0 km/h (Yes in step S11), the control section 19 executes a process of returning to step S1 described above.

Description of the process of step S7 described above will continue. When it is determined that the accelerator opening degree is less than the first opening (Yes in step S7), next, the control section 19 acquires a temperature signal (step S12). In detail, the control section 19 acquires the temperature signal which relates to the temperature of the hydraulic oil which is output by the oil temperature detecting section 90. Then, the control section 19 determines whether or not the temperature of the hydraulic oil is equal to or less than a first temperature which is set in advance based on the temperature signal (step S13). Here, the first temperature is a temperature where a response delay occurs in the hydraulic motor 15 due to the viscosity of the hydraulic oil increasing. For example, the first temperature is 10 degrees Celsius. When it is determined that the temperature of the hydraulic oil is equal to or less than the first temperature (Yes in step S13), the control section 19 executes the first control. That is, the control section 19 executes a process from step S9 and beyond described above.

On the other hand, when it is determined that the temperature of the hydraulic oil is more than the first temperature (No in step S13), the control section 19 executes the second control (step S14). When the second control is executed, the control section 19 controls the motor capacity control section 16 such that the motor capacity is a minimum value which is set in advance for each speed level. In the present embodiment, since the maximum speed level is selected as the speed level, the control section 19 controls the motor capacity control section 16 such that the motor capacity is a minimum value of the motor capacity at the maximum speed level. In detail, the control section 19 controls the motor capacity control section 16 such that the motor capacity is M4.

Next, the control section 19 acquires a vehicle speed signal (step S15). In detail, the control section 19 acquires the vehicle speed signal which is output from the vehicle speed detecting section 59. The control section 19 determines whether or not the vehicle speed of the wheel loader 1 is 0 km/h based on the vehicle speed signal (step S16).

When it is determined that the vehicle speed is not 0 km/h (No in step S16), the control section 19 executes a process of returning to step S14 described above. On the other hand, when it is determined that the vehicle speed is 0 km/h (Yes in step S16), the control section 19 executes a process of returning to step S1 described above.

Characteristics

The wheel loader 1 according to the present embodiment has the following characteristics.

(1) It is possible to prevent rapid deceleration of the wheel loader 1 since the control section 19 executes the first control or the second control when there is a switching operation and the accelerator opening degree is less than the first opening. In detail, when the control section 19 executes the first control, it is possible to prevent rapid deceleration of the wheel loader 1 due to a switching operation since the capacity of the hydraulic motor 15 is maintained before and after the switching operation. In addition, when the control section 19 executes the second control, it is possible to prevent rapid deceleration of the wheel loader 1 due to a switching operation since the capacity of the hydraulic motor 15 is controlled to be the minimum value.

(2) The control section 19 executes the first control in a case where the temperature of the hydraulic oil is equal to or less than the first temperature which is set in advance, that is, in a case where it is easy for a response delay to occur in the hydraulic motor. Here, when the control section 19 executes the first control, the capacity of the hydraulic motor 15 is maintained before and after the switching operation by the forward and reverse switching lever 84. As a result, the motor capacity after the first control is released does not increase rapidly from the motor capacity when the first control is being executed and hunting oscillation does not occur. In addition, in a case where the temperature of the hydraulic oil is higher than the first temperature which is set in advance, it is difficult for hunting oscillation to occur even when the control section 19 executes the second control since it is difficult for a response delay to occur in the hydraulic motor 15.

(3) The control section 19 performs the first control in a case of selecting the maximum speed level where the maximum speed is the highest in maximum speed variable control. When the maximum speed level is selected, it is easy for hunting oscillation to occur since the minimum value of the capacity of the hydraulic motor 15 is minimized. It is possible to efficiently suppress hunting oscillation by the control section 19 executing the first control in the case where it is easy for hunting oscillation to occur.

MODIFIED EXAMPLES

Above, an embodiment of the present invention is described but the present invention is not limited to this and various modifications are possible without departing from the gist of the present invention.

Modified Example 1

Figure 10:
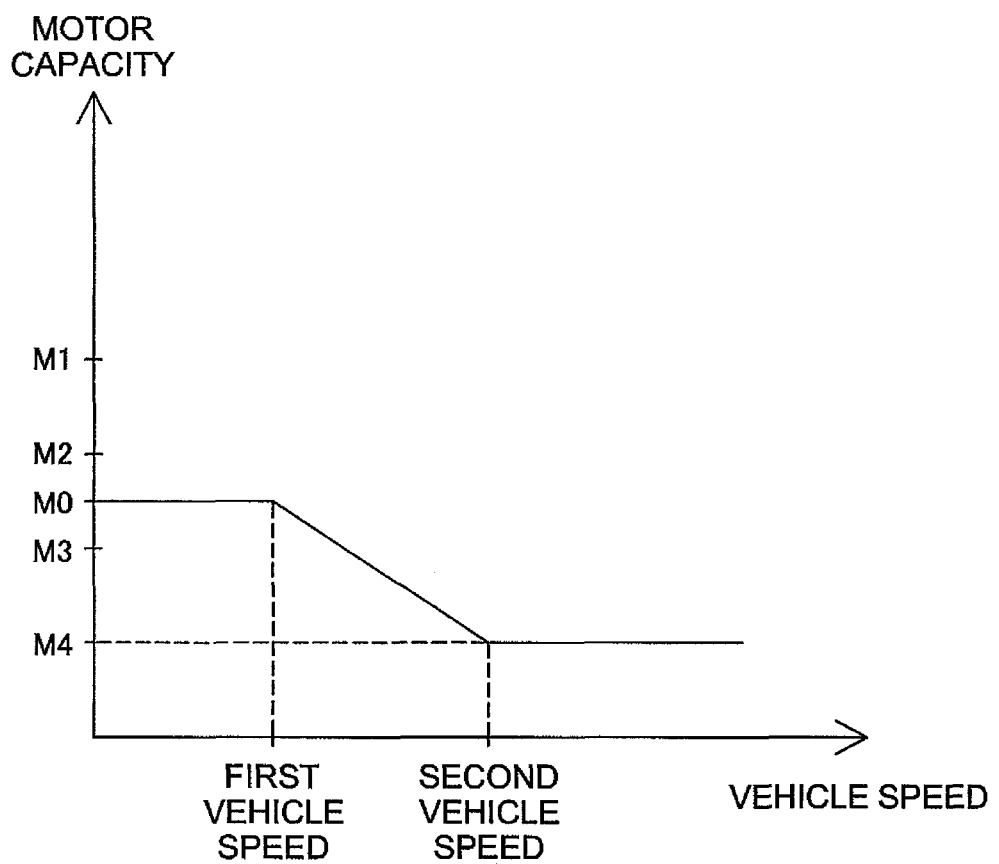
FIG. 10 is a diagram illustrating an example of a feature of a lower limit value of vehicle speed and motor capacity according to a first modified example.
Figure 11:
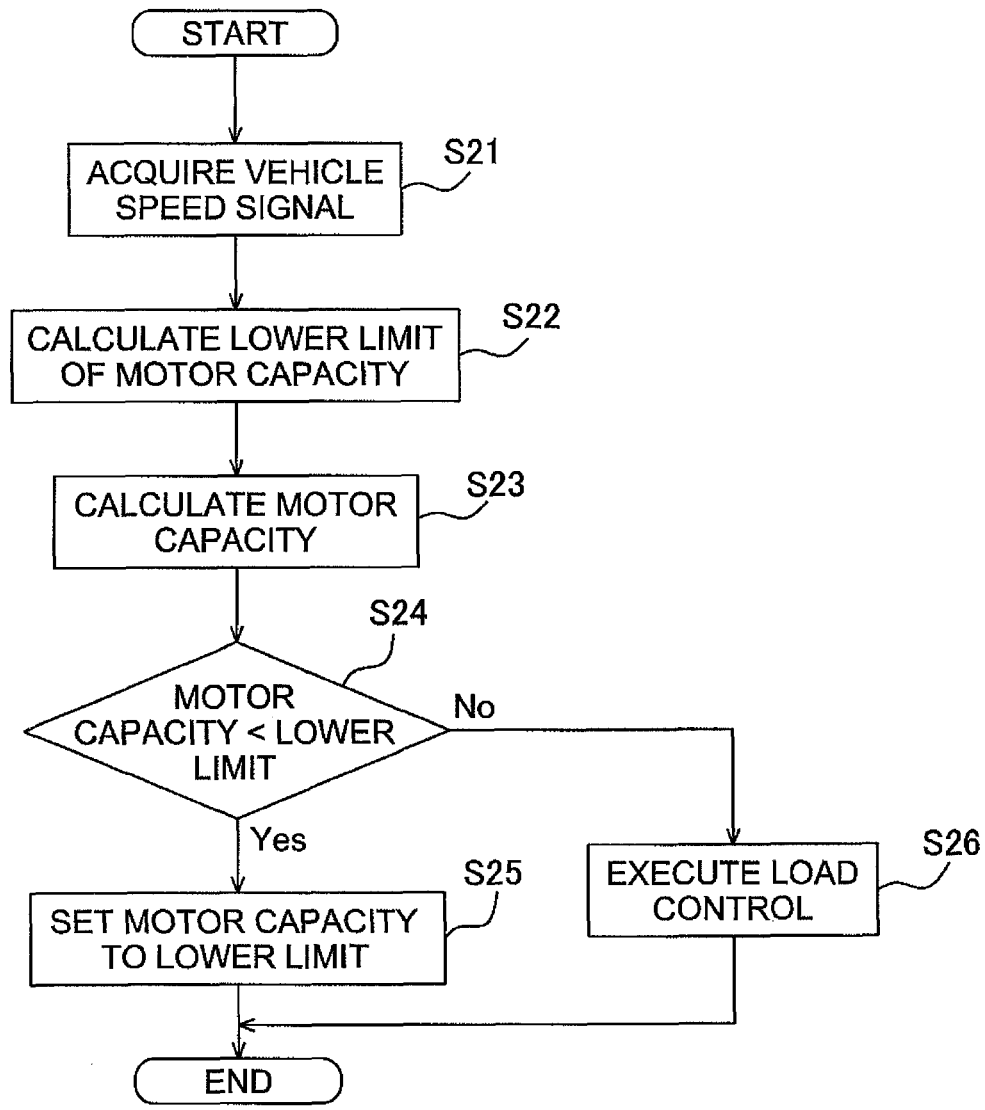
FIG. 11 is a flow chart illustrating a control method according to the first modified example.

In the embodiment described above, the control section 19 may control the motor capacity control section 16 so that the motor capacity is equal to or more than a lower limit value which is set in advance based on the vehicle speed when the control section 19 executes load control. In detail, the control section 19 stores a map which indicates a relationship between the vehicle speed and the lower limit value of the motor capacity as shown in FIG. 10. First, the control section 19 acquires a vehicle speed signal as shown in FIG. 11 (step S21). In detail, the control section 19 acquires the vehicle speed signal which is output from the vehicle speed detecting section 59. The control section 19 calculates the lower limit value of the motor capacity at this vehicle speed based on the vehicle speed signal and the map described above (step S22).

Next, the control section 19 calculates the motor capacity (step S23). In detail, the control section 19 calculates the motor capacity so that the actual hydraulic drive pressure is closer to the target hydraulic drive pressure in load control described above. The control section 19 determines whether or not the motor capacity which is calculated is less than the lower limit value of the motor capacity which is calculated in the process in step S22 (step S24).

In a case where it is determined that the motor capacity which is calculated is less than the lower limit (Yes in step S24), the control section 19 controls the motor capacity control section 16 so that the motor capacity is the lower limit value. For example, with the vehicle speed less than the first speed, the lower limit value of the motor capacity is constant at M0, and with the vehicle speed equal to or more than the second speed, the lower limit value of the motor capacity is constant at the minimum value of the motor capacity at the fourth speed. In addition, when the vehicle speed is equal to or more than the first speed and less than the second speed, the lower limit value of the motor capacity is reduced as the vehicle speed increases. Here, the first speed is a value which is smaller than the second speed, and for example, the first speed is 8 km/h and the second speed is 20 km/h. In addition, the lower limit value M0 of the motor capacity when the vehicle speed is less than the first speed is the maximum speed level, that is, is larger than the minimum value M4 of the motor capacity at the fourth speed.

In a case where it is determined that the motor capacity which is calculated is equal to or more than the lower limit value (No in step S24), the control section 19 executes load control described above (step S26). That is, the control section 19 controls the motor capacity control section 16 so that the motor capacity is the motor capacity which is calculated in the process in step S23.

It is possible to obtain the following effects by the control section 19 controlling in this manner. It is easy for hunting oscillation to occur when the capacity of the hydraulic motor 15 is small when the vehicle speed is a low speed. In contrast to this, it is possible to suppress occurrence of hunting oscillation by the control section 19 controlling the motor capacity control section 16 so that the capacity of the hydraulic motor 15 is equal to or more than the lower limit value which is set in advance based on the vehicle speed.

Modified Example 2

In the embodiment described above, PID control is performed but another feedback control may be performed.

Modified Example 3

In the embodiment described above, the oil temperature detecting section 90 which detects the temperature of the hydraulic oil which is discharged from the hydraulic motor 15 is used as an oil temperature detecting section, but the temperature of the hydraulic oil may be detected from another location.

Modified Example 4

In the embodiment described above, members with a dial format are used as the traction selection member 89 and the speed level selection member 92, but other members such as a switch with a sliding format or a lever may be used. In addition, the number of steps of the maximum traction force which are able to be selected in traction control is not limited to the number of steps described above. Furthermore, it is possible for the maximum traction force to be continuously changed according to the operation amount of the traction selection member 89. In addition, the number of levels of speed in maximum speed variable control is not limited to the number of levels of speed described above. Furthermore, it is possible for the maximum speed to be continuously changed in maximum speed variable control according to the operation amount of the speed level selection member 92.

The invention claimed is:

1. A wheel loader comprising:
   an engine;
   a hydraulic pump configured and arranged to be driven by the engine;
   a variable capacity hydraulic motor configured and arranged to be driven by hydraulic oil discharged from the hydraulic pump;
   a motor capacity control section configured to control a capacity of the hydraulic motor;
   a plurality of moving wheels configured and arranged to be driven by the hydraulic motor;
   an oil temperature detecting section configured and arranged to detect a temperature of the hydraulic oil;
   an accelerator opening detecting section configured and arranged to detect an accelerator opening degree;
   a forward and reverse switching operation member configured and arranged to perform a switching operation in order to output an instruction for switching a moving state of the wheel loader to one of a forward state, a reverse state or a neutral state;
   an operation detecting section configured and arranged to detect a switching instruction from the forward and reverse switching operation member; and
   a control section configured to selectively execute one of a first control and a second control in a case where the accelerator opening degree is less than a first opening degree which is set in advance and the switching operation is performed by the forward and reverse switching operation member, the control section being configured to control the motor capacity control section in the first control so as to maintain the capacity of the hydraulic motor before and after the switching operation, the control section being configured to control the motor capacity control section in the second control such that the capacity of the hydraulic motor is a minimum value which is set in advance at each speed level,
   the control section being configured to execute the first control in a case where the temperature of the hydraulic oil is equal to or less than a first temperature which is set in advance and to execute the second control in a case where the temperature of the hydraulic oil is higher than the first temperature.

2. The wheel loader according to claim 1, wherein
   the control section is configured to execute a maximum speed variable control where a maximum speed of the wheel loader is changed on a plurality of levels due to a change in a minimum value of the capacity of the hydraulic motor.

3. The wheel loader according to claim 2, wherein
   the control section is configured to perform the first control in a case where the maximum speed level where the maximum speed is the highest in the maximum speed variable control is selected.

4. The wheel loader according to claim 1, further comprising
   a vehicle speed detecting section configured and arranged to detect a vehicle speed.

5. The wheel loader according to claim 4, wherein
   the control section is configured to cease execution of the first control or the second control when the vehicle speed reaches 0 km/h.

6. The wheel loader according to claim 1, further comprising
   a pressure detecting section configured and arranged to detect a hydraulic drive pressure which is a pressure of the hydraulic oil which drives the hydraulic motor,
   wherein the control section is configured to execute a third control for controlling the motor capacity control section such that the hydraulic drive pressure approaches a predetermined target hydraulic drive pressure in a case where the switching operation is not performed by the forward and reverse switching operation member.

7. The wheel loader according to claim 6, wherein
   the control section is configured to control the motor capacity control section in the third control such that the capacity of the hydraulic motor is equal to or more than a lower limit value which is set in advance based on the vehicle speed.

8. The wheel loader according to claim 1, wherein
   the first temperature is 10 degrees.

9. The wheel loader according to claim 1, wherein
   the first opening degree is 50%.

* * * * *